Aug. 13, 1929.　　　　S. L. MOSHER　　　　1,724,037
SEED GATHERING DEVICE
Filed July 10, 1924　　　5 Sheets-Sheet 1
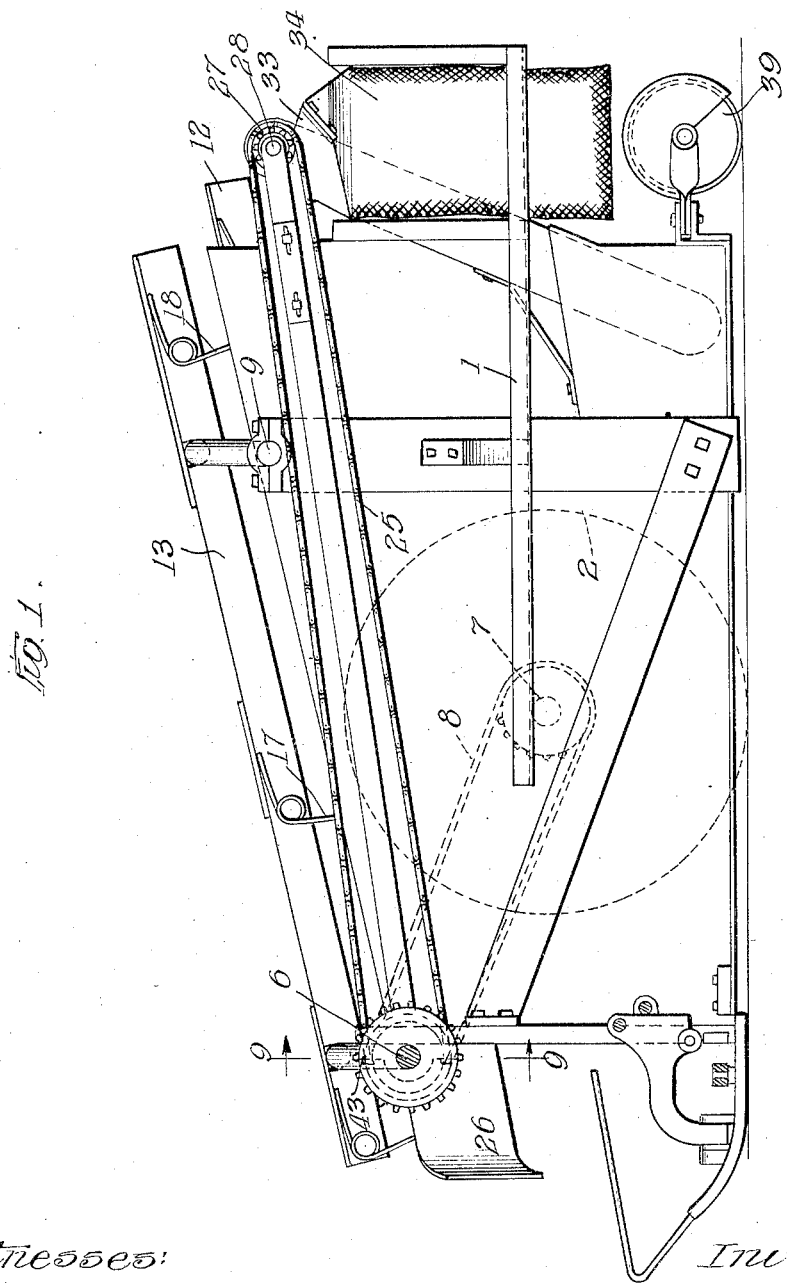

Aug. 13, 1929.  S. L. MOSHER  1,724,037
SEED GATHERING DEVICE
Filed July 10, 1924   5 Sheets-Sheet 2
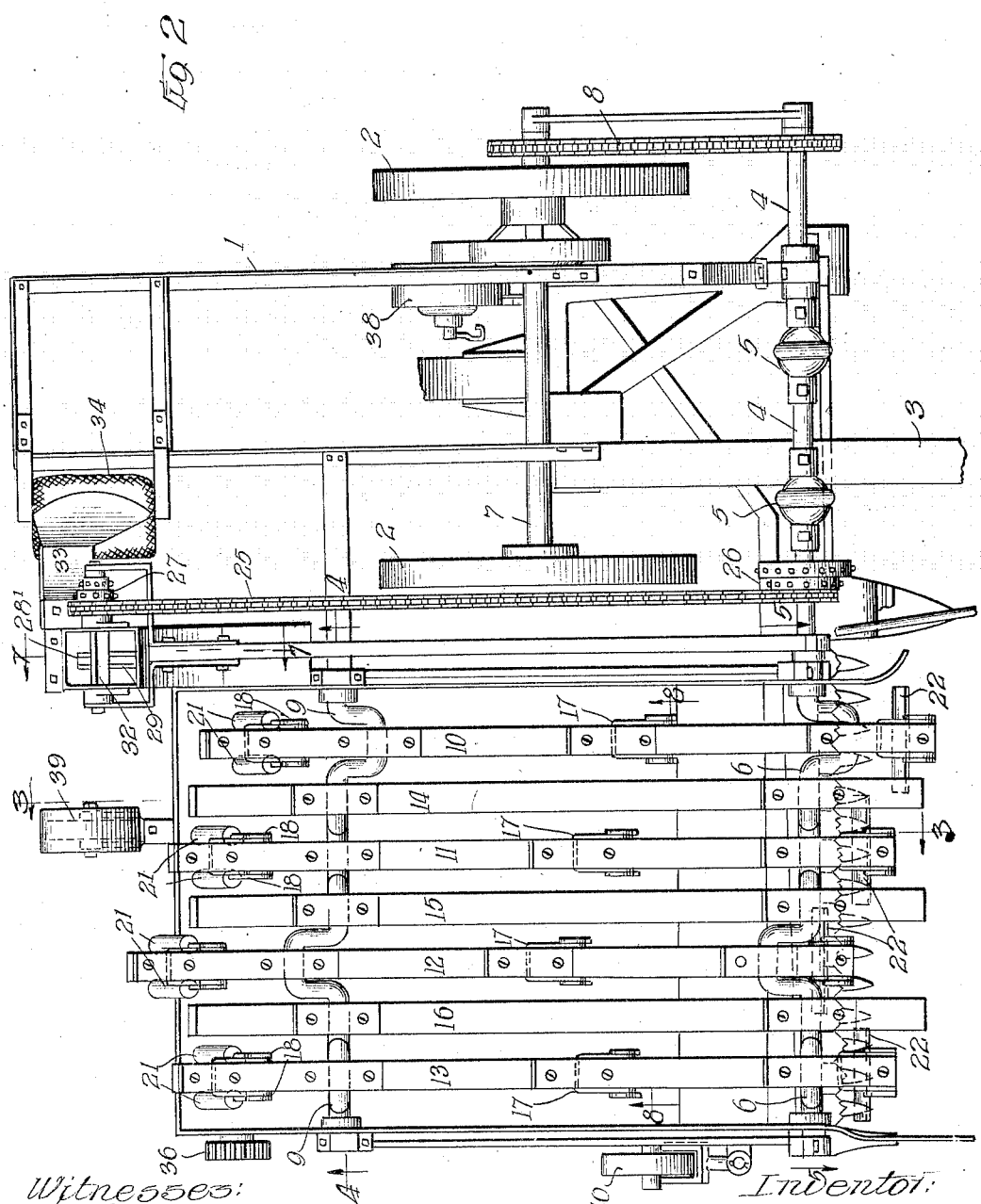

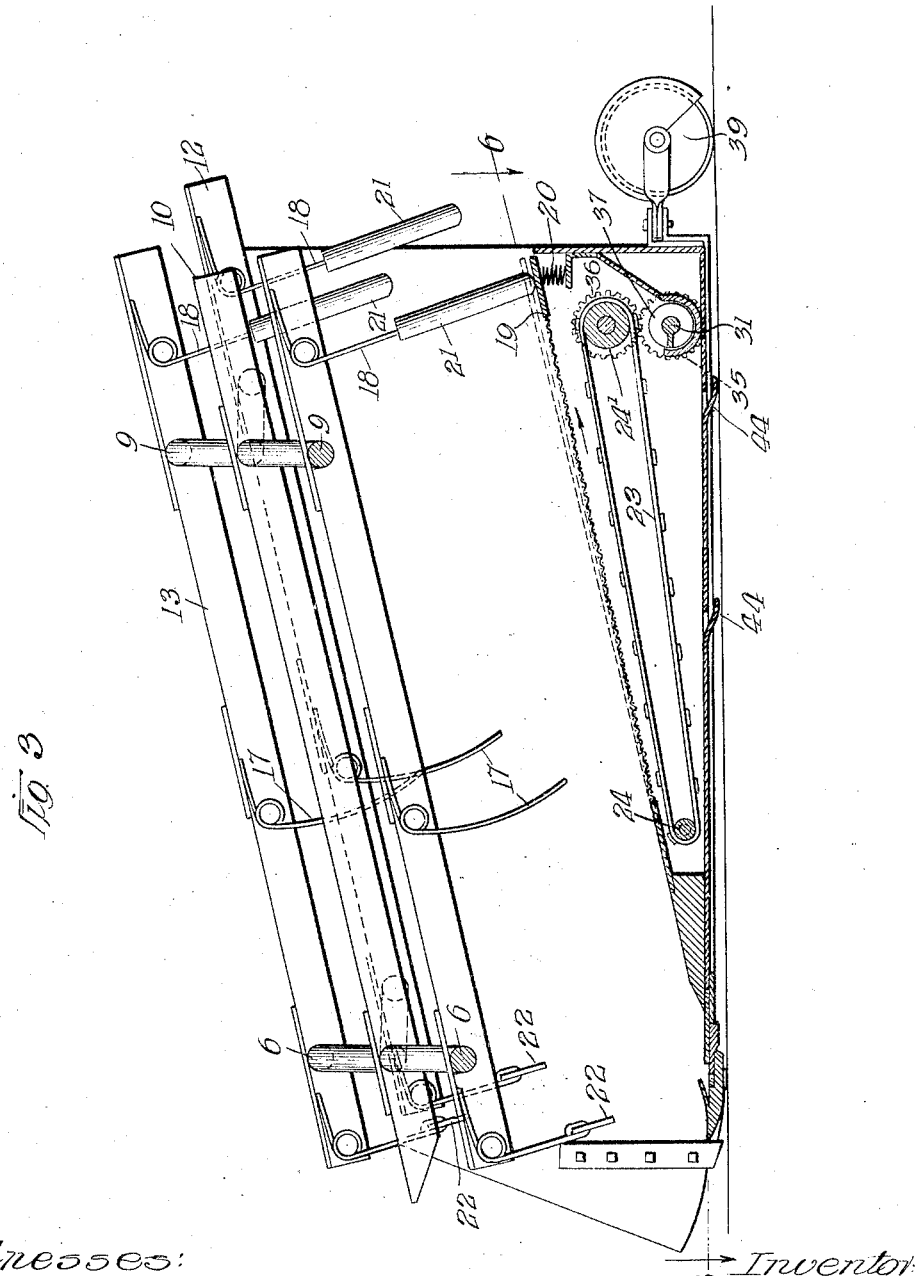

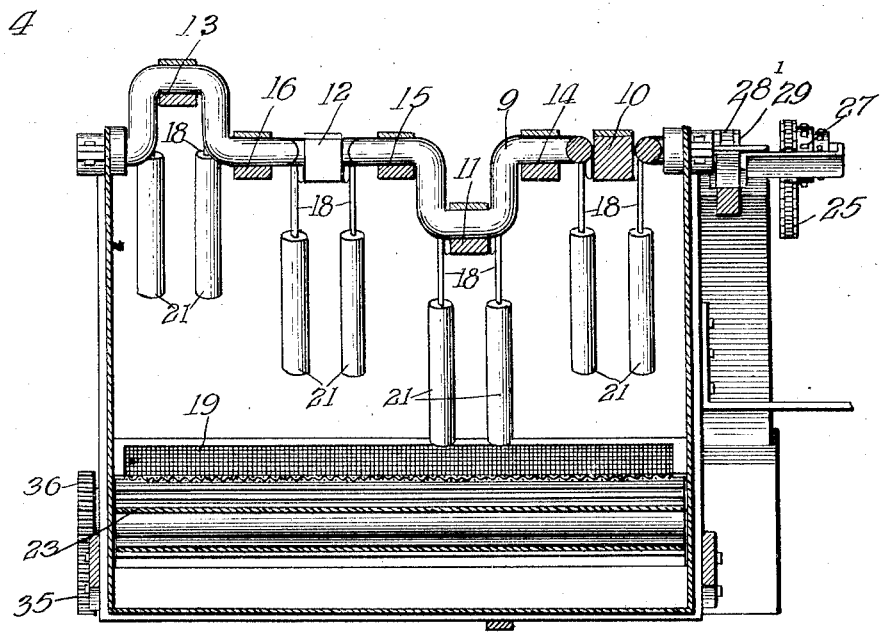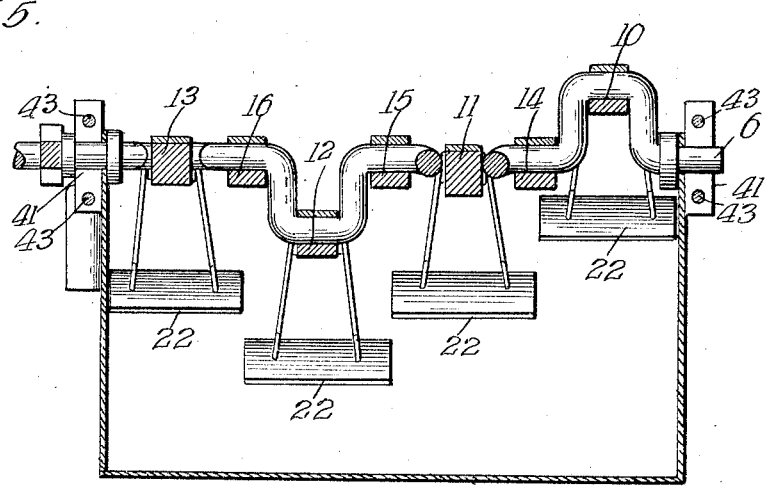

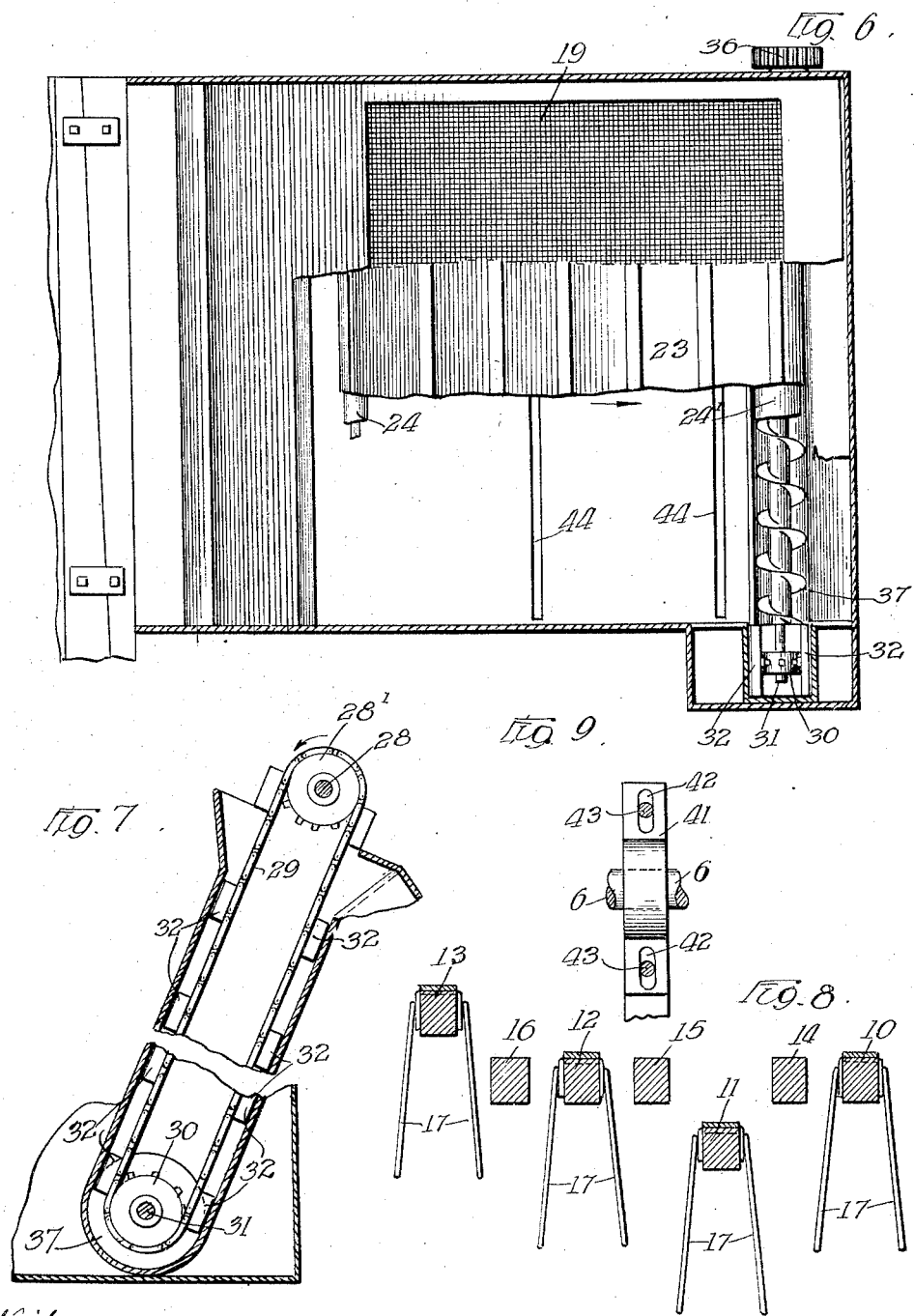

Patented Aug. 13, 1929.

1,724,037

UNITED STATES PATENT OFFICE.

SHERMAN L. MOSHER, OF COFFEEVILLE, MISSISSIPPI.

SEED-GATHERING DEVICE.

Application filed July 10, 1924. Serial No. 725,197.

My invention relates particularly to that general class of harvesting machines of the mower or reaper type in which the standing stalks of grain are cut by the operation of a driven sickle or cutter bar, falling backwards upon a suitable platform or receiving board. It is particularly designed to reliably gather and deliver the seeds from the standing grain that are shed or released during the cutting operation. With certain classes of grass and grain this loss of seed is important, and this is particularly true of that class represented by seed bearing plants sometimes classed as Japanese clover or Lespedesia.

In the latter class the shedding of the seed during the middle of the day in the cutting operation is very great, and in addition to that, the particular seed that is shed during the cutting operation is much more fertile.

My invention is particularly adapted for the harvesting of seeds of this particular class and in practical operation has proven very effective.

To this end, my invention consists in the novel construction, arrangement and combination of parts herein shown and described, and more particularly pointed out in the claims.

In the drawings, wherein like reference characters indicate like or corresponding parts:

Fig. 1 is a side elevation of a machine showing the preferred form of embodiment;

Fig. 2 is a top plan view of the same;

Fig. 3 is a section taken on line 3—3 of Fig. 2;

Fig. 4 is a section taken on line 4—4 of Fig. 2;

Fig. 5 is a similar section taken on line 5—5 of Fig. 2;

Fig. 6 is a partial plan view of the supporting platform, the parts being broken away to show the construction;

Fig. 7 is a fragmentary vertical section taken through conveying apparatus forming part of the improved machine;

Fig. 8 is a diagrammatic view showing the preferred arrangement of certain parts forming part of the improved machine; and Fig. 9 is a detail view of an adjustable journal box forming part of the machine.

In the drawings, referring particularly to Fig. 2, the right hand portion of the device may be of the conventional seed cutting device in which 1 represents the frame, 2 the carrying wheels, 3 the pole to which the team is attached, 4 the shaft for driving the mechanism for moving the cut grain back over the platform, provided with suitable couplings 5—5 or equivalent means providing the necessary flexibility between the two sections to properly drive the shaft 6 (practically an extension of the shaft 4, see Figs. 1 and 2), which actuates the straw-moving mechanism. Power is taken from the main shaft 7 by means of a chain 8.

The shaft 6 referred to constitutes the front crank shaft, Figs. 2 and 5.

To the rear of said crank shaft is positioned a companion or cooperating crank shaft 9. Extending from the driven crank shaft 6 of the companion crank shaft 9 and connecting the two at the proper sections thereof, are a series of bars 10, 11, 12 and 13, while positioned between the approximate pairs of said bars are dividing bars 14, 15 and 16 (Figs. 2, 4 and 5).

By this mechanism it will be seen that the rotation of the crank shaft 6 will cause a reciprocation of the bars 10, 11, 12 and 13, the bars extending above the platform, as shown in Fig. 3, the said bars during said reciprocation being given a rising and falling movement.

Supported upon the reciprocating bars in any preferred manner, are depending rods 17 which are preferably resilient in their connection, and also if desired in their character. These may extend downward in the form of fingers as shown in Figs. 3 and 8, or the various pairs may be connected substantially as shown in Fig. 5 or in any preferred manner for the purpose. In the rear, somewhat similar bars 18 are provided, and in such manner as in their operation to strike upon the rear portion of the screen 19 which is preferably resiliently supported at its rear end by a spring 20 or equivalent means.

By this means these bars 18 form a series of strikers which by reason of the construction and support of the screen 19 materially aids in causing the seed to be released and readily pass through the screen. In the preferred form shown, I show a series of pads or cushions 21 mounted upon the bars 18 to give a larger striking surface, and if necessary a cushioning stroke, and preventing a too rapid wear upon the screen. I have had satisfactory results by making the pads 21 of rubber or equivalent material.

I have had saitsfactory results both in having the depending rods 17 in the form of fingers, as shown in Figs. 3 and 8, and also by having the pairs of rods on each bar connected by plates, as shown in Fig. 5.

The function of these rods, however, separately or connected is to contact with and move the cut grain upon the screen 19 steadily backward, discharging the same over the rear of the machine, while at the same time their action aids in the shedding action to relieve the straw from the seed, and this is further aided by the constant striking of the pads 21 upon the resilient screen.

I have had satisfactory results with a plain fixed screen and without the strikers 21, but I prefer the resilient spring and strikers, although I do not desire to be understood as limiting myself to that particular construction.

The movement of the several bars 10, 11, 12 and 13 may be as desired, depending upon the particular form of the crank shafts.

As shown in Fig. 8, for illustration, the construction is such that the rods 17 engage the straw successively, that is, one after the other, in such manner as to cause a continuous movement of the straw backward over the screen. I have also had satisfactory results in arranging the bars in alternative pairs, such for example, as 10 and 12, and 11 and 13, and have the pairs successively engage the straw and move it forward.

The arrangement is such that the reciprocating bars as they move toward the rear are brought down close enough to the screen to cause the fingers or rods 17 to operatively engage the straw and move it rearward the distance the bar moves rearward. At this point the crank shafts are so arranged that they lift the bar upward to its highest point, releasing the fingers or rods 17 from the straw and the bar then moves toward the front of the machine, and as it approaches that point is again brought down to repeat the operation described.

Beneath the screen is a movable web or belt 23 supported upon parallel rollers 24—24 (Fig. 3) which may be operated in any preferred manner. The rollers are driven in any preferred manner.

Referring to Fig. 2, this may be done, for illustration, by means of the drive chain 25 engaging the stepped sprocket wheel 26 carried on the shaft 4 at one end and at the other end engaging the cooperating stepped sprocket wheel 27 mounted on the shaft 28 (Fig. 7). The shaft 28 serves as the upper or supporting shaft for the drive chain 29, which at its lower end is mounted upon the sprocket wheel 30 carried by the shaft 31.

The sprocket chain 30 is an elevating chain provided with buckets 32 which serve to elevate the gathered seed and deliver the same into a chute 33 beneath which is supported a sack or receptacle 34 (Figs. 1 and 2).

Referring now to Fig. 7, it will be seen that the shaft 28 at the top is driven in the direction indicated by the arrow, transmitting a corresponding movement to the lower shaft 31 (Figs. 3 and 6), is extended across the machine, and at its upper end is provided with a gear 35 which meshes with a gear 36 rotating the shaft carrying the roller 24.

This causes the upper face of apron 23 to move upward and backward, carrying the seed and delivering the same over the rear end thereof, whereby it falls into a trough, within which is a worm screw conveyor mounted upon the shaft 31. This serves to convey the seed toward the elevator and deliver the same into the lower end or boot thereof, in which it is taken up by the buckets and delivered into the bag or conveyor as stated.

The cutter bar may be driven in the ordinary way by means of mechanism contained within the housing 38 and thence transmitted in the usual way. The pilot wheel 39 aids in supporting the rear end of the machine and aids the same in turning, and the supporting wheel 40 serves to support the outer end of the platform in the proper position.

It will be seen from the description that a reel will not be necessary in this form of device, the cut straw being moved upward and backward over the face of the screen, which latter is regularly agitated or struck to cause it to vibrate, aiding in releasing the seed and passing the same through upon the apron conveyor 23, from which point the seed is delivered to the worm conveyor and thence to the elevator and to the sack or other receptacle.

Fig. 9 illustrates a detail of the adjustable box 41 taken on line 9—9 of Fig. 1, by means of which the height of the shaft 6 may be adjusted as desired. It is also clearly shown in Fig. 5.

As shown in Fig. 9, it will be seen that the box is provided with slots 42—42 allowing its vertical adjustment, while the bolts 43 serve to lock it in its adjusted position.

In the preferred construction, the bottom of the pan beneath the belt 23 is constructed with perforations or slots of desirable form, or equivalent means to permit the escape of the dirt and dust that may accumulate from continued use (Fig. 3).

It is obvious that the supporting bars 14, 15, 16 (Figs. 5 and 8) may be increased in number, dimensions, form, arrangement and material to secure the best results.

Having thus described my invention, it is obvious that various immaterial modifications may be made in the same without de- parting from the spirit of my invention; hence I do not wish to be understood as limiting my invention further than is specifically set forth in the claims.

What I claim as new and desire to secure by Letters Patent is:

1. In a seed harvester actuated by its movement over the field, the combination of stalk cutting mechanism and means for actuating the same, with a screen platform for receiving the cut grain, means for resiliently supporting the screen platform, longitudinally movable bars arranged above the platform, means for reciprocating said bars, means depending from the bars for advancing the cut stalks over the screen platform, and means for periodically striking the screen platform to facilitate the passage of shed seeds therethrough.

2. In a seed harvester actuated by its movement over the field, the combination of stalk cutting mechanism and means for driving the same, with a screen platform, means for advancing the cut stalk over said screen platform, means for resiliently supporting the rear end of the screen platform, and means for vibrating the screen platform.

3. In a device of the kind described, the combination of grain cutting mechanism and means for driving the same, with a screen platform for receiving the cut grain, said platform being connected at its front end and resiliently supported at its rear end, a plurality of longitudinally reciprocating bars, means for reciprocating said bars, fingers depending from said bars arranged to advance the cut grain over the platform, and strikers actuated by the reciprocating bars to periodically strike the resilient end of the screen.

4. In a seed harvester actuated by its movement over the field, the combination with grain cutting mechanism and means for driving the same, with a screen for receiving the cut stalk, said screen being connected at its front end and resiliently supported at its rear end, strikers actuated to periodically strike the resilient end of the screen means arranged beneath the screen for conveying the shed seed from beneath the screen to one end thereof, a box enclosing the bottom beneath the screen and conveyor, said box provided with openings therethrough beneath the screen whereby dust and dirt may escape from the device.

5. In a seed harvester actuated by its movement over the field, the combination of stalk cutting mechanism and means for driving the same, with a screen for receiving the cut stalks, means for moving the cut stalks over the screen, a receiver, a conveyor beneath the screen for removing the shed seed falling through the screen, and conveying and elevating means for removing the seed and transmitting the same to the receiver.

6. In a device of the kind described, the combination of grain cutting mechanism and means for driving the same, with a screen platform upon which the cut grain falls, said screen being connected at its front end and resiliently supported at its rear end, a plurality of longitudinally reciprocating arms and means for actuating the same, depending fingers carried by the arms arranged to move the cut grain over the screen, and strikers carried by the rear end of said arms and adapted as the arms are reciprocated to strike upon the resiliently supported end of the screen.

7. In a device of the kind described, the combination of grain cutting mechanism and means for driving the same, with a screen platform for receiving the cut grain, said platform being connected at its front end and resiliently supported at its rear end, a plurality of longitudinally reciprocating bars, means for reciprocating said bars, fingers depending from said bars arranged to advance the cut grain over the platform, and added strikers actuated by the reciprocating bars to periodically strike the resilient end of the screen.

8. In a device of the kind described, the combination of grain cutting mechanism, a driven shaft provided with flexible sections engaged with and driving a crank shaft, a cooperating crank shaft spaced from the first mentioned crank shaft, a plurality of bars mounted upon the crank shafts and adapted to be reciprocated by their rotation, depending fingers carried by the bars and strikers also carried by the bars, with a screen platform for receiving the cut grain, the front end of the platform being fixedly connected and the rear end resiliently supported, whereby the depending fingers will engage and carry the cut grain over the platform and the strikers will strike upon the rear end of the screen.

9. In a device of the kind described, the combination of grain cutting mechanism, a driven shaft engaged with and driving a crank shaft, means for adjusting the height of the bearings of said crank shaft, a cooperating crank shaft spaced from the first mentioned crank shaft, a plurality of bars mounted upon the crank shafts and adapted to be reciprocated by their rotation, depending fingers carried by the bars and strikers also carried by the bars, with a screen platform for receiving the cut grain, the front end of the platform being fixedly connected and the rear end resiliently supported, whereby the depending fingers will engage and carry the cut grain over the platform and the strikers will strike upon the rear end of the screen, 10. In a device of the kind described, the combination of grain cutting mechanism, a driven shaft engaged with a driving crank shaft, means for vertically adjusting the bearings of the crank shaft, a cooperating crank shaft spaced from the first mentioned crank shaft, a plurality of bars mounted upon the crank shafts and adapted to be reciprocated by their rotation, depending fingers carried by the bars and strikers also carried by the bars, with a screen platform for receiving the cut grain, the front end of the platform being fixedly connected and the rear end resiliently supported, and conveying means arranged beneath the screen adapted to catch and remove the seed shed through the screen, whereby the depending fingers will engage and carry the cut grain over the platform and the strikers will strike upon the rear end of the screen to increase the shedding of the seed therethrough.

In testimony whereof I have hereunto signed my name.

SHERMAN L. MOSHER.